(12) United States Patent
Ryland et al.

(10) Patent No.: US 12,547,871 B2
(45) Date of Patent: Feb. 10, 2026

(54) NEURAL NETWORK OBFUSCATION BY DISCRETIZATION

(71) Applicant: Raytheon Company, Arlington, VA (US)

(72) Inventors: James Ryland, Dallas, TX (US); Philip A. Sallee, South Riding, VA (US)

(73) Assignee: Raytheon Company, Arlington, VA (US)

( * ) Notice: Subject to any disclaimer, the term of this patent is extended or adjusted under 35 U.S.C. 154(b) by 787 days.

(21) Appl. No.: 17/889,008

(22) Filed: Aug. 16, 2022

(65) Prior Publication Data

US 2024/0062036 A1   Feb. 22, 2024

(51) Int. Cl.
*G06N 3/04* (2023.01)
*G06N 3/08* (2023.01)

(52) U.S. Cl.
CPC .............. *G06N 3/04* (2013.01); *G06N 3/08* (2013.01)

(58) Field of Classification Search
CPC ............ G06N 3/04; G06N 3/063; G06N 3/08
See application file for complete search history.

(56) References Cited

U.S. PATENT DOCUMENTS

| | | | |
|---|---|---|---|
| 10,740,432 B1* | 8/2020 | Diamant | G06N 3/045 |
| 2019/0114509 A1* | 4/2019 | Deng | G06N 3/084 |
| 2020/0257978 A1* | 8/2020 | Roy | G06N 3/08 |
| 2023/0114002 A1* | 4/2023 | Flint | G06N 3/0464 |
| | | | 706/25 |

FOREIGN PATENT DOCUMENTS

CN   112712164 A   4/2021

* cited by examiner

*Primary Examiner* — Brent Johnston Hoover
(74) *Attorney, Agent, or Firm* — Schwegman Lundberg & Woessner, P.A.

(57) ABSTRACT

Embodiments regard neural network (NN) obfuscation. A method can include receiving data representing the NN architecture. The NN architecture includes neurons, each neuron comprising corresponding neuron input weights, an activation function, and one or more interconnections between one or more other neurons of the neurons. The method can include mapping inputs to the neurons from a continuous domain to a discrete domain resulting in discretized neuron inputs. The method can include applying the activation function to the discretized neuron inputs resulting in discretized neuron outputs.

14 Claims, 10 Drawing Sheets

NEURAL NETWORK OBFUSCATION BY DISCRETIZATION

TECHNICAL FIELD

Embodiments discussed herein regard devices, systems, and methods for securing a neural network (NN).

BACKGROUND

Preventing adversarial attacks on neural networks (NN) is challenging. Techniques for protection of NNs is desired.

DETAILED DESCRIPTION

Figure 1:
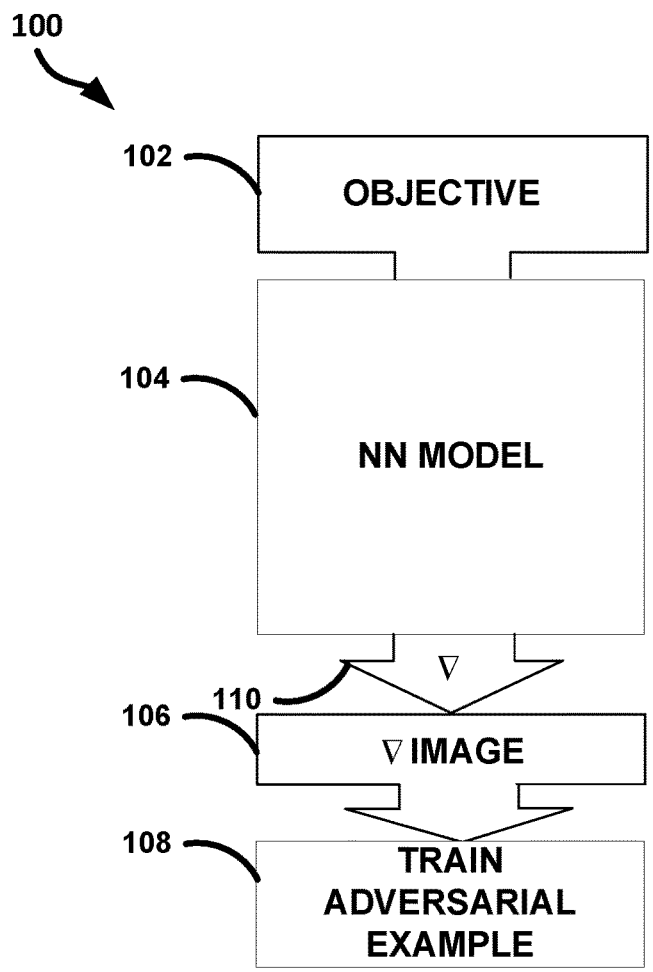
FIG. 1 illustrates, by way of example, a conceptual block diagram showing training a model to generate output that attacks a neural network (NN).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

When given a neural network (NN) architecture (weights, activation functions, inputs etc.) taking the derivatives for training or the like are performed almost entirely automatically using an auto-differentiation package. These packages work by using a lookup list of rules for each continuous mathematical operation $(+,-,/,*,\log, e^\wedge, \text{etc.})$ and vector/array operations in order to give the derivative for each operation, which can be used to make a sort of reversed version of the network which can calculate the forward network's derivatives for weights and inputs when given the networks activations, and its inputs & outputs.

Embodiments make the auto-differentiation process useless and thus help to protect the NN from an attack. An NN is more vulnerable to an adversarial attack when an attacker has access to a gradient of a model, output of the model, or can approximate the gradient of the model. In some instances, an attacker can use the gradients of an NN to create modified input patterns, sometimes called adversarial examples (AE) or spoofing, that will cause the NN to make erroneous output. A common approach to generating the AE is to use the gradients of the NN to derive noise added to inputs that will confuse the NN. An input plus the noise forms the AE. Protecting from AEs is important because, in image recognition for example, an erroneously characterized object can mean a misidentified or overlooked potential threat.

The AE can be used to attack multiple different NNs because multiple different NNs have similar decision boundaries, input gradients, and output gradients. These similarities mean access to the specific model is unnecessary for the attacker. Protecting NNs from these sorts of attacks is difficult, at least in part, because the NNs are typically assumed accurate based on testing of the models. The possible vulnerability of the model is thus generally unknown until after it is attacked.

Some aspects of the technology disclosed herein are directed to new techniques for protecting an NN. In some embodiments, a method receives data representing the architecture of the NN. The method maps the inputs of neurons of the NN from a continuous domain to a discrete domain. Then the activation functions are accordingly applied to the mapped inputs resulting in activation function output. The method converts the activation function output to corresponding indices. The indices can be scrambled, such as for additional obfuscation. The method obfuscates the architecture of the NN thus reducing the chances that an attacker can determine how to attack the NN with certain inputs.

Discretizing, indexing, scrambling, or otherwise generating a representation of an NN that is stored in a LUT, obscures the math operations in the NN and makes the normal auto-differentiation process completely useless. A LUT does not have a meaningful derivative rule, thus making the gradient obscured. Any method of auto-differentiation would now have to painstakingly unravel and unpack combined and scrambled operations within the LUTs to infer the original functions that make up the network and pick the right derivative rules making the auto-differentiation process difficult if not impossible.

Throughout this document, some method(s) (e.g., in FIG. 5) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates, by way of example, a conceptual block diagram showing training a of an adversarial example (AE) that attacks a neural network (NN) 104. Attacking the NN 104 can be easier with access to either of a gradient 110 of the NN 104, output 106 of the NN 104, or a combination thereof. An adversarial attack on the NN 104 is considered a success if the AE causes the NN 104 to misclassify an input. The NN 104 is trained to achieve an objective 102. The objective 102 can be reduced entropy, cross entropy loss, mean square error, or maximum likelihood, among others.

An AE 220 (see FIG. 2) is an input that confuses the NN 104. The AE 220 can be generated in an adversarial manner, such as by using gradients of a model, to generate inputs that the model 104 will misclassify. The objective 102 of this training can be to minimize the accuracy of the model 104 based on the AE 220 input. The NN model 104 can be used by the NN attacker to create an input based on the gradient 110 or image gradient 106 to train the AE at operation 108.

In a typical NN training, weights/parameters of the NN are learned or adjusted. In contrast, when trying to find an AE, the NNs weights/parameters are frozen, and the input image/patterns are treated as the parameters to be learned, with the new objective of making the NN misclassify an NN input. When an adversary has access the NN model and the mathematical representation of the NN model, it is rather trivial to have a new objective for learning, hold weights/parameters of the NN fixed, and to adjust/create an input image to better fool itself.

Figure 2:
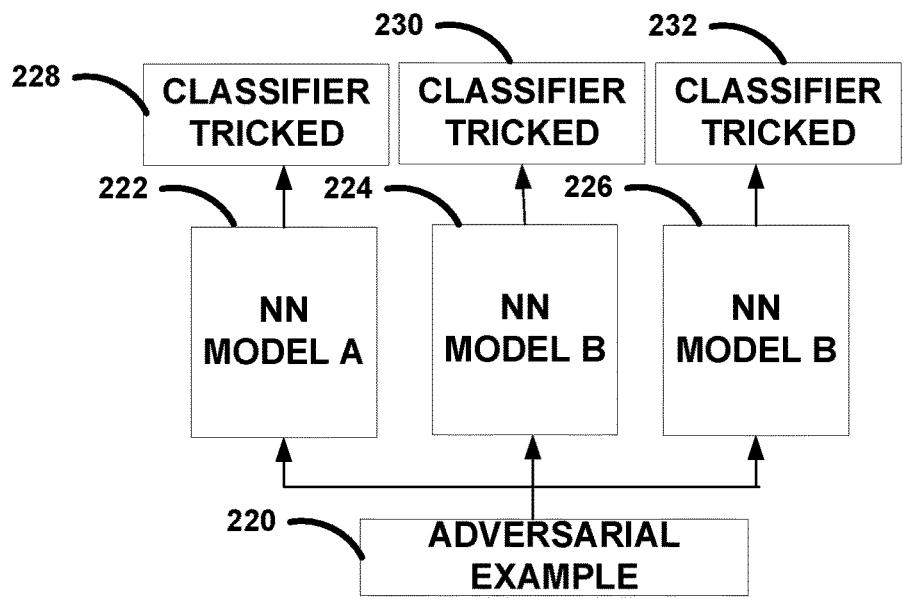
FIG. 2 illustrates, by way of example, a conceptual block diagram showing how a trained model can generalize to attack multiple NNs.

FIG. 2 illustrates, by way of example, a conceptual block diagram showing how a trained model can generalize to attack multiple NNs. An AE 220 is the result of operation 108. After the AE 220 is generated at operation 108, it can be used to generate images (or other inputs) that will fool multiple NNs 222, 224, 226. The AE 220 can be an image that causes the models 222, 224, 226 to misclassify the input image, thus making the output of the models 222, 224, 226 unreliable. The models 22, 224, 226 (indicated by erroneous output 228, 230, 232) and the attack is considered a success. The models 222, 224, 226 can be similar models. A similar model means that the model was trained on similar data, a similar objective function, or to determine similar classifications, a combination thereof, or the like. Attacks on similar models means that access to the weights, parameters, and gradients, or the like of all models is often unnecessary.

Figure 3:
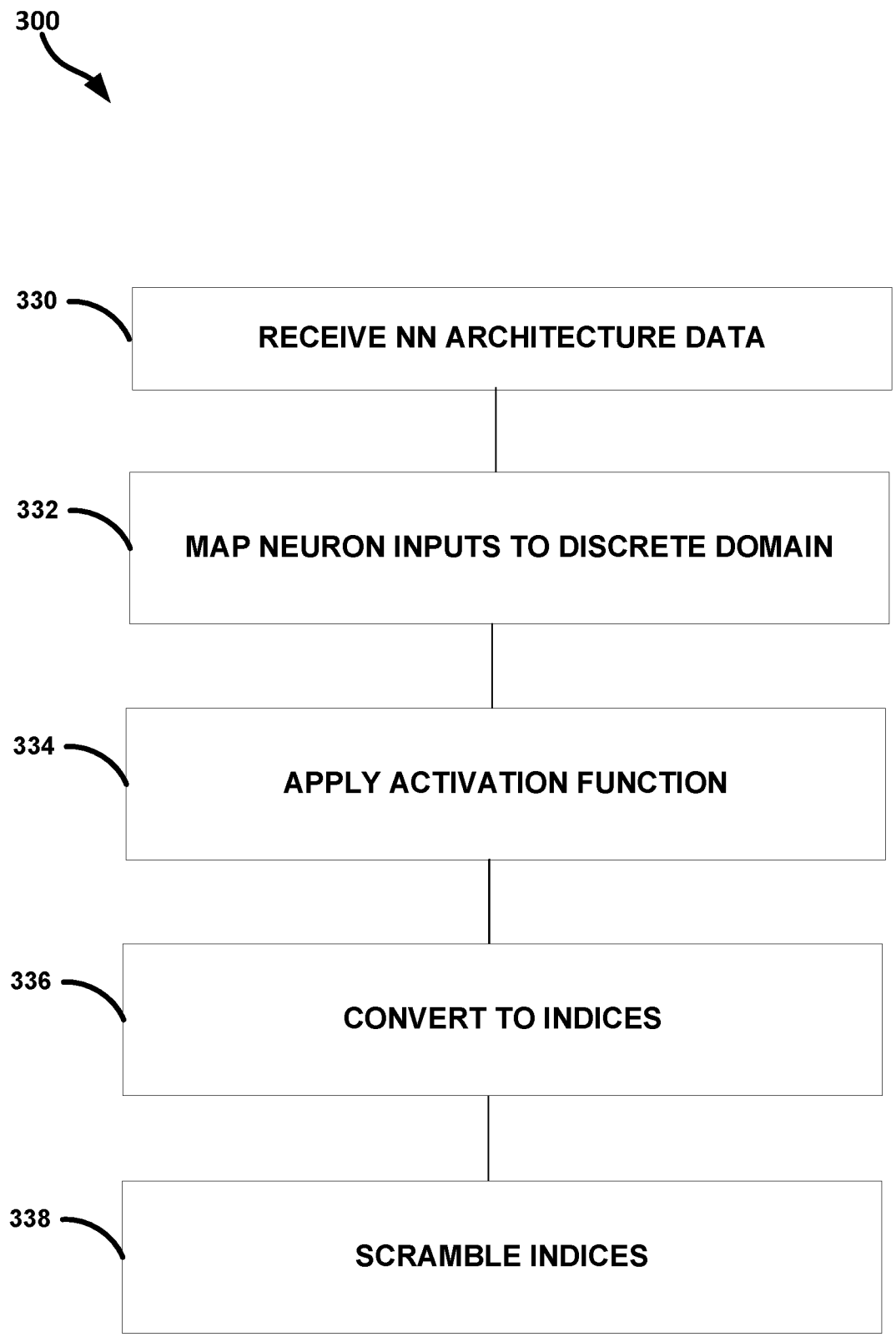
FIG. 3 illustrates, by way of example, a flow diagram of a method for NN obfuscation by discretization, in accordance with some embodiments.

FIG. 3 illustrates, by way of example, a flow diagram of an embodiment of a method 300 for NN obfuscation by discretization and optionally scrambling. The method 300 can be performed for all neurons in an NN. The method 300 as illustrated includes receiving NN architecture data, at operation 330; mapping neuron inputs to a discrete domain resulting in discretized inputs, at operation 332; applying an activation function to discretized inputs resulting in discretized output, at operation 334; converting discretized inputs, discretized output, or a combination thereof to indices, at operation 336; and scrambling the indices or discretized inputs, at operation 338.

The operation 330 includes receiving data representing an architecture of the NN 104. The architecture of the NN 104 includes neurons, each neuron comprising corresponding input weights, an activation function, and one or more interconnections between one or more other neurons of the neurons. The operation 330 can include mapping the inputs from the interconnections to a discrete domain, which can be achieved by discretization or quantization.

The operation 332 includes mapping real numbered neuron input values to a specified number of discrete (e.g., real or integer) values. The number of discrete values is configurable. Many of the examples described use three discrete values but more or fewer discrete values can be used and each input or output can include a same or different number of discrete values.

The operation 334 includes applying the activation function of a neuron to a discretized input. The activation function of a neuron defines a neuron output based on the neuron input. The discretized inputs can be combined mathematically before the operation 334 is applied. The mathematical combination of neuron inputs can include addition, weighted addition, subtraction, multiplication, division, a combination thereof, or the like. Since the neuron inputs can have a finite number of possible values, the mathematical combination of neuron inputs has only a finite number of possible values. The mathematical combination of neuron inputs can be stored in an intermediary LUT, such as when multiple input neurons are combined and LUTs are generated for each part of the mathematical combination. All possible combined values of the neuron inputs can be determined and stored in the intermediary LUT.

The operation 334 can include applying the activation function to all possible combined values to find all possible neuron outputs of the activation function. The number of neuron outputs will be finite because the number of possible combinations of the discretized neuron inputs is guaranteed to be finite. An entry for each possible combination of discretized neuron input values that represents the activation function output for a given mathematical combination of neuron inputs can be stored in a LUT. The LUT can be referenced in lieu of actually computing the weighted summation of the neuron inputs and the activation function. Thus, the activation function output can be represented as a LUT, the entry of which is based on only values of the discretized neuron input(s).

At operation 336, the discretized neuron inputs and neuron outputs can optionally be converted to indices. An index is a value zero or greater and differs from a nearest integer by one. The discrete domain inputs, in contrast, can be positive, negative, and may not differ from its nearest integer by one.

The indices can be optionally scrambled at operation 338. Scrambling the indices means that the indices are no longer in ascending or descending order. How the indices are scrambled is not important as long as the actual activation function output that corresponds to an index or discrete domain value is retained for reference.

The method 300 provides a way to prevent attacks on an NN. Attacks on NNs can be addressed by changing the operation of the NN from operating in a continuous number domain to operating in a discrete number domain. Changing the operation of the NN results in gradients that are more difficult to discern and the changed operations makes it more difficult to unwrap and access the original trained model parameters. Changing the operation thus makes it more difficult to train an attacking AE or other NN input because the discretization of the NN obscures access to the gradient of the network, or more specifically the gradient of the objective function with respect to the input of the network.

The method 300 can include, for a given neuron of the neurons of an NN, mathematically combining all neuron inputs to the neuron in question, resulting in all possible combined neuron inputs to the given neuron and wherein applying the activation function includes applying the activation function to the all possible combined neuron inputs.

The method 300 can include, wherein the mathematically combining includes combining the inputs to the neuron in order from smallest weight to largest corresponding neuron input weight. The method 300 can include, wherein mapping the neuron inputs comprises discretizing the neuron inputs or quantizing the neuron inputs.

The method 300 can include after combining two inputs of a neuron input, binning all possible values of the combined neuron inputs into a first specified number of bins and then combining the first specified number of bins with a third input of the neuron input and binning results of combining the specified number bins with the third neuron input into a second specified number of bins, the first specified number of bins and the second specified number of bins include a same number of bins. The combining and binning of inputs can be repeated for any number of inputs to a neuron.

The method 300 can include, wherein the data representing the NN architecture includes data representing an NN input layer and an output layer of the NN architecture. The method 300 can include providing, for each of the neurons, the discretized neuron inputs and discretized neuron outputs as a lookup table. The method 300 can include converting one or more of the discretized neuron outputs to a classification.

The NN 104 produces NN outputs 106 that adhere to a probability distribution that can be used to extrapolate the gradient 110 and exploit the NN 104. After the neuron inputs and neuron outputs are discretized, the activation function is no longer needed as the neuron inputs and neuron outputs can be defined by a simple LUT. The indexing of the discretized neuron inputs and neuron outputs can help further obscure the operation of the NN 104. The scrambling of the discretized neuron inputs and neuron outputs can help further obscure the operation of the NN 104.

Figure 4:
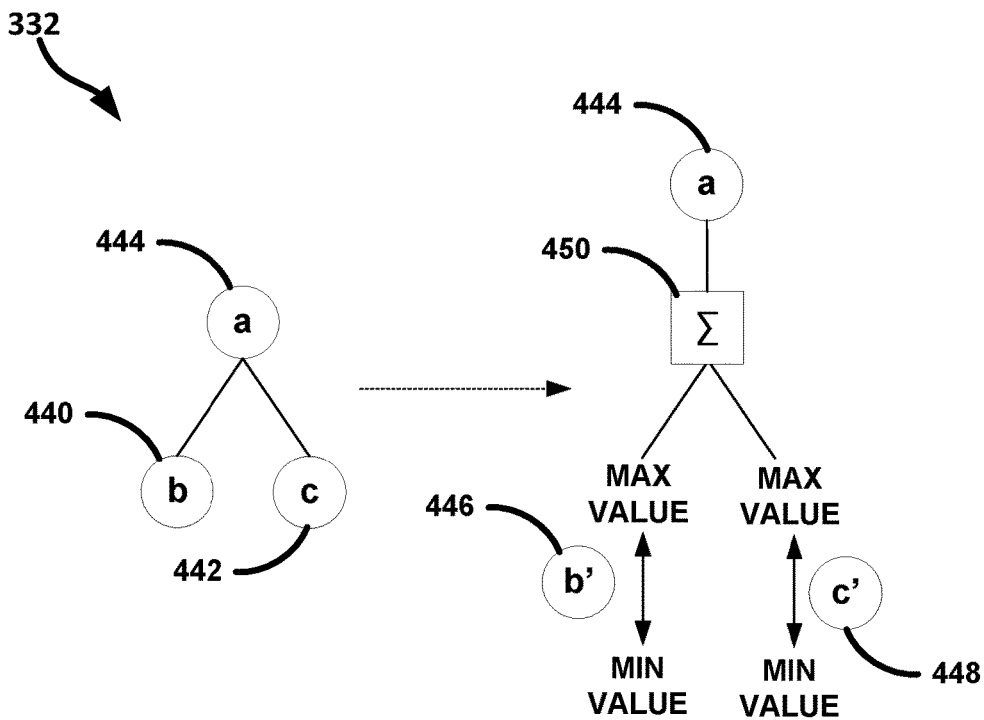
FIG. 4 illustrates, by way of example, a flow diagram of mapping neuron inputs to a discrete domain.

FIG. 4 illustrates, by way of example, a flow diagram of the operation 332 that includes mapping neuron inputs to a discrete domain. A neuron comprises neuron inputs 440, 442 to an activation function 444. The neuron output is the output of the activation function 444. The neuron inputs 440, 442 are real-valued. The neuron can include its neuron inputs 440, 442 replaced with discretized neuron inputs 446, 448, respectively. The discretized neuron inputs 446, 448 can range from a same or different minimum and maximum real numbers or integers. The step size between discrete values for each neuron is configurable and does not have to be constant or consistent between neurons. Depending on the method of discretization (interval sampling, quantization, or learned or optimized distances) even or uneven spacing between closest discrete values is possible.

The discretized neuron inputs 446, 448 can be combined by a mathematical operation 450. For many of the examples, the operation 450 is a simple addition, but more complex mathematical combinations of the discretized neuron inputs 446, 448 can be performed. The combined neuron inputs from the operation 450 can be input to the activation function 444. The output of the activation function 444 is the neuron output.

Figure 5:
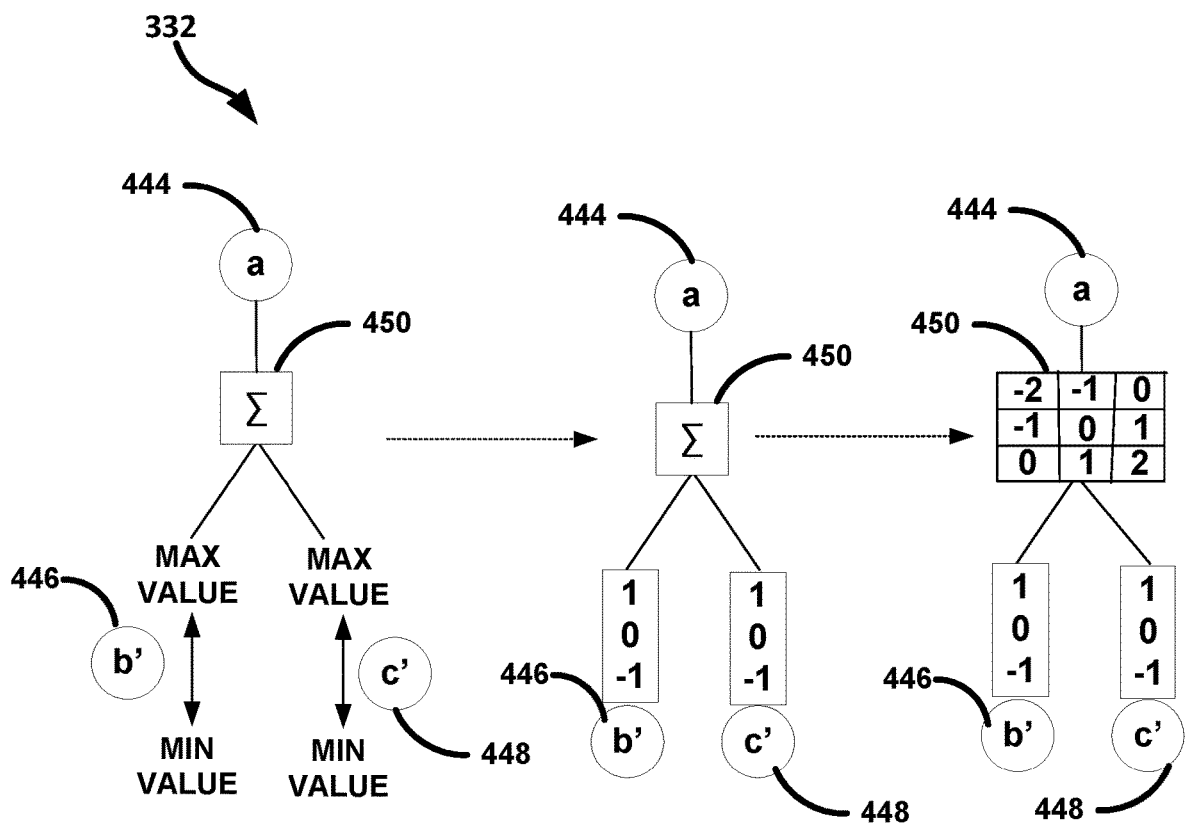
FIG. 5 illustrates, by way of example, a flow diagram of mapping neuron inputs to a discrete domain.

FIG. 5 illustrates, by way of example, a flow diagram of a portion of the operation 332 that includes mapping neuron inputs to a discrete domain with example values. Mapping the neuron input to the discrete domain allows the mathematical combination of neuron inputs to be represented by entries of a finite entry LUT. The discretized inputs 446, 448 in the example of FIG. 5 include three values, but other numbers of values and values are possible. The discretized inputs 446, 448 can be mapped to values [−1, 0, 1].

The operator 450 in the example of FIG. 5 is a simple addition. The mathematical combination of the discretized neuron inputs 446, 448 falls in the range [−2, −1, 0, 1, 2]. This range is all possible combinations of the neuron inputs 446, 448.

Figure 6:
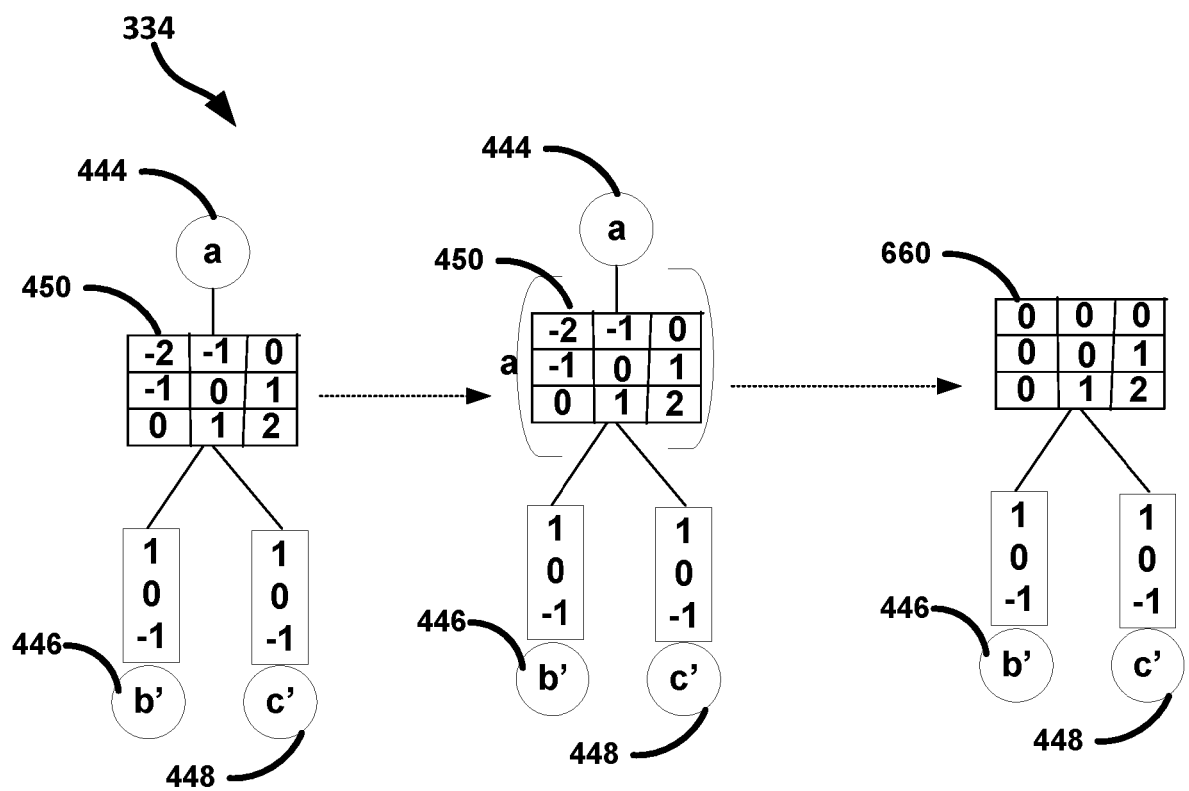
FIG. 6 illustrates, by way of example, a flow diagram of applying an activation function.

FIG. 6 illustrates, by way of example, a flow diagram of an embodiment of the operation 334. The operation 334 includes applying the activation function 444 to the combined discretized neuron inputs 446, 448. The activation function 444 in the example of FIG. 6 is max(0, b'+c'). Using this activation function 444, a resulting neuron output 660 falls in the range [0, 1, 2]. The whole neuron can thus be represented by a LUT with the discretized neuron inputs 446, 448 defining inputs that index into an entry in the LUT that represents neuron output 660.

Figure 7:
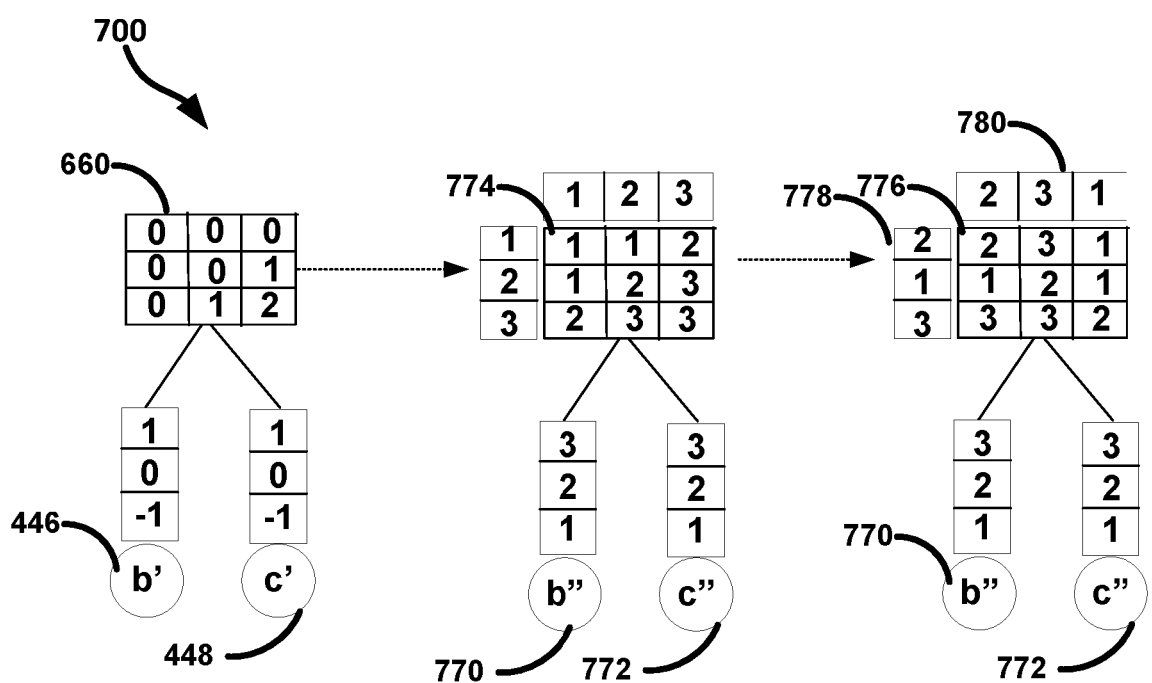
FIG. 7 illustrates, by way of example, a flow diagram showing how a neuron and its inputs can be represented by a lookup table (LUT).

FIG. 7 illustrates, by way of example, a flow diagram of an embodiment of a method 700 that includes both optional operations 334 and 336. The method 700 includes converting the discretized neuron inputs 446, 448 to indexed neuron inputs 770, 772. The indexed neuron inputs 770, 772 include the discretized neuron inputs represented by consecutive, non-negative integers. In the example of FIG. 7, the consecutive, non-negative integers include [1, 2, 3]. The neuron output 660 has also been converted to indices as indexed neuron output 774. The indexed neuron output 774, like the discretized neuron output 660, includes three values.

The indexed or discretized neuron inputs and neuron outputs can be scrambled. The example of FIG. 7 shows the indexed neuron inputs 770, 772 and indexed neuron output 774 scrambled as scrambled, indexed neuron inputs 778, 780 and scrambled, indexed neuron output 776. Alternatively, the discretized neuron inputs 446, 448 and neuron output 660 can be scrambled without indexing. The scrambling can follow any heuristic as long as the neuron output remains consistent with the neuron input.

Figure 8:
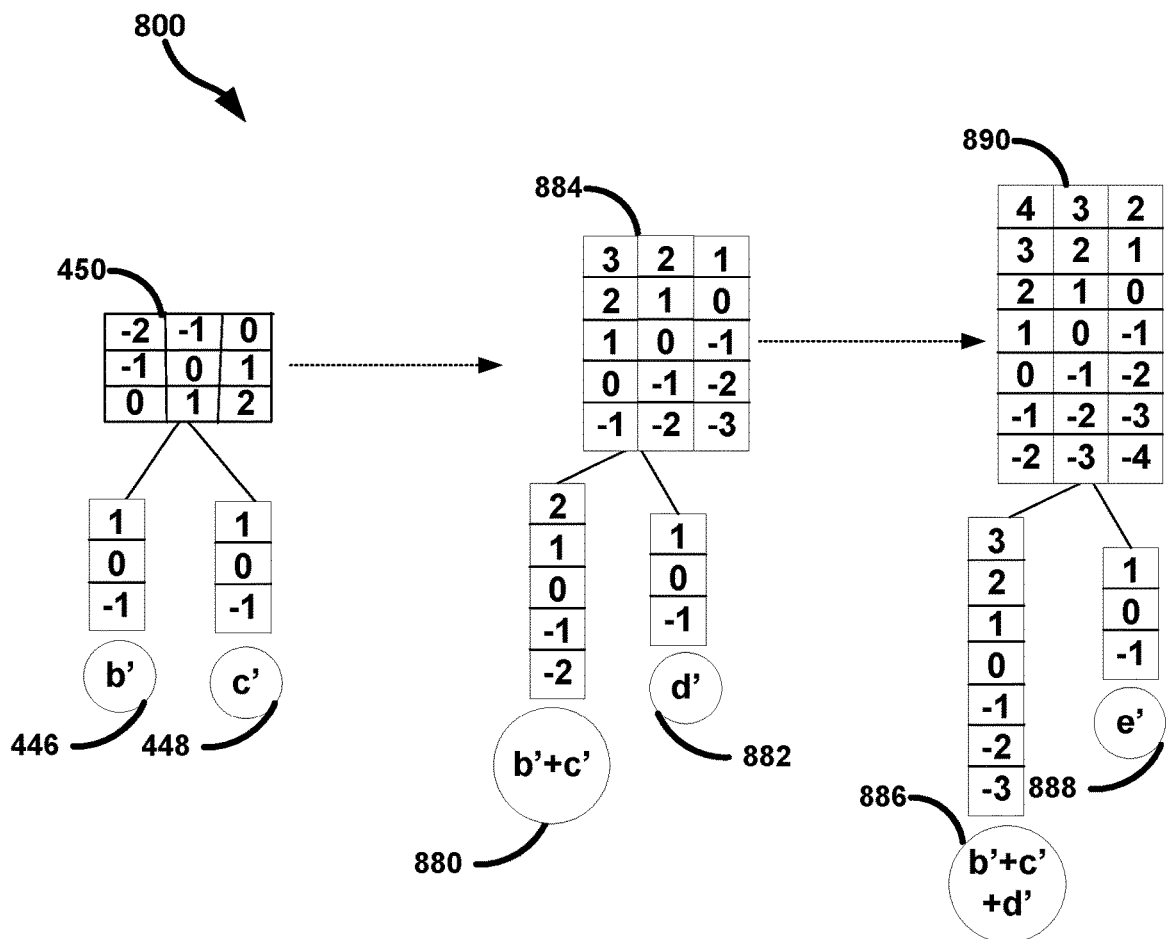
FIG. 8 illustrates, by way of example, a flow diagram showing how a LUT-based neuron representation explodes with increasing inputs and number of possible input values.

FIG. 8 illustrates, by way of example, a flow diagram of neuron input combining 800 that shows how a LUT-based neuron representation explodes with increasing number of neuron inputs and number of possible neuron input values. The combining 800 includes working serially through the weighted summation operation of a typical neuron by recursively pairing inputs to a neuron to generate a table of all possible combined neuron input sums and combining the possible values of those neuron inputs with the next neuron input and so on. Not all neurons use weighted summation as part of their calculation to combine inputs, and some portions of this combining 800 are better for neurons that use a weighted summation to combine inputs or a comparable operation. The combining 800 is applicable to neurons which combine neuron inputs in any manner which is commutative and associative (the order of how inputs are combined does not matter). But special care can be taken as not all operations are equally as stable in a numerical sense.

The combination of the discretized neuron inputs 446, 448 results in a combined discretized neuron input 880 with a range ([−2, −1, 0, 1, 2] in the example of FIG. 8) that is larger than the range of either of the discretized neuron inputs 446, 448. Then a third neuron input 882 is combined with the discretized neuron input 880. The combination of the third neuron input 882 and the combined discretized neuron input 880 results in possible neuron input values 884 for a combined discretized neuron input 886 with a range ([−3, −2, −1, 0, 1, 2, 3] in the example of FIG. 8) that includes more possible values than the range of either of the discretized neuron inputs 880, 882. Then, when a fourth neuron input 888 is added to the combined discretized neuron input 886, the range of the combined neuron input

890 includes even more possible values, [−4, −3, −2, −1, 0, 1, 2, 3, 4] in the example of FIG. 8. This input explosion increases memory requirements to operate the discretized version of the NN. This explosion can be avoided by binning the possible values for a combination of input neurons into a specified number of bins to keep the number of possible values for a neuron input consistent through the discretized version of the NN. This keeps the number of values stored in each summation table for each subsequent pair of neurons constant such that the total number of stored values grows linearly with respect to the number of neurons.

Figure 9:
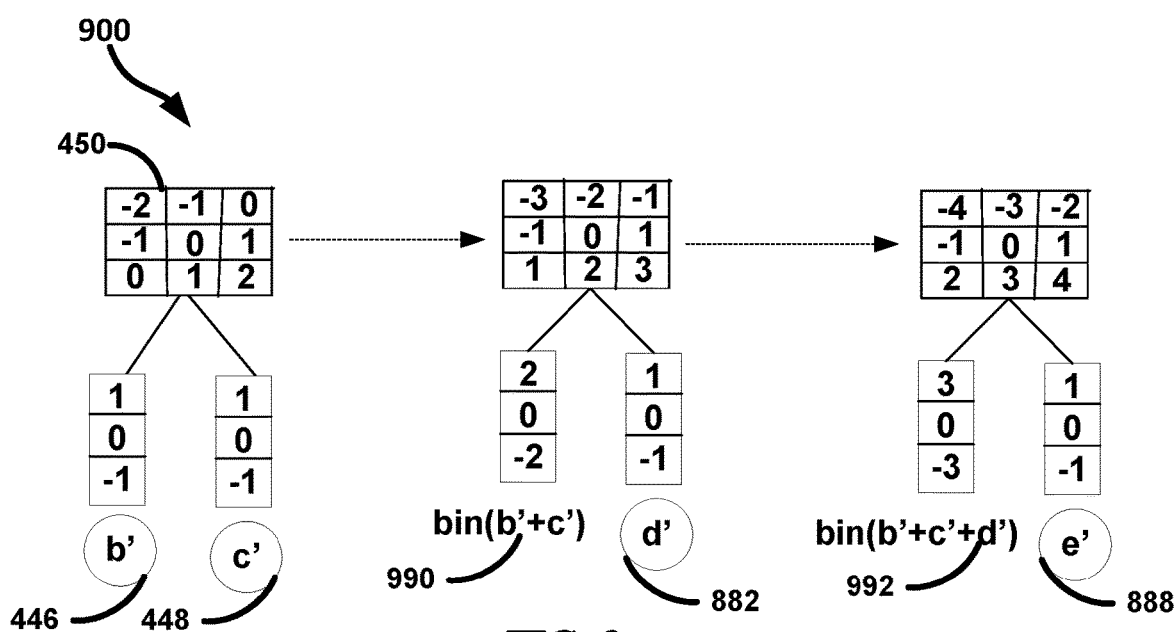
FIG. 9 illustrates, by way of example, a flow diagram showing how to stop the LUT-based neuron representation from exploding with increasing number of inputs and/or a number of possible input values.

FIG. 9 illustrates, by way of example, a flow diagram of an operation 900 for stopping a neuron representation from exploding with increasing number of neuron inputs or a number of possible neuron input values. The operation 900 as illustrated includes binning possible neuron inputs from the operations 450 into a specified number of bins to keep the possible number of combined input values from exploding in number. The binning is a type of discretization. The binning can be repeated for each combination of the binned combined neuron inputs 990, 992 and another input 882, 888.

Figure 10:
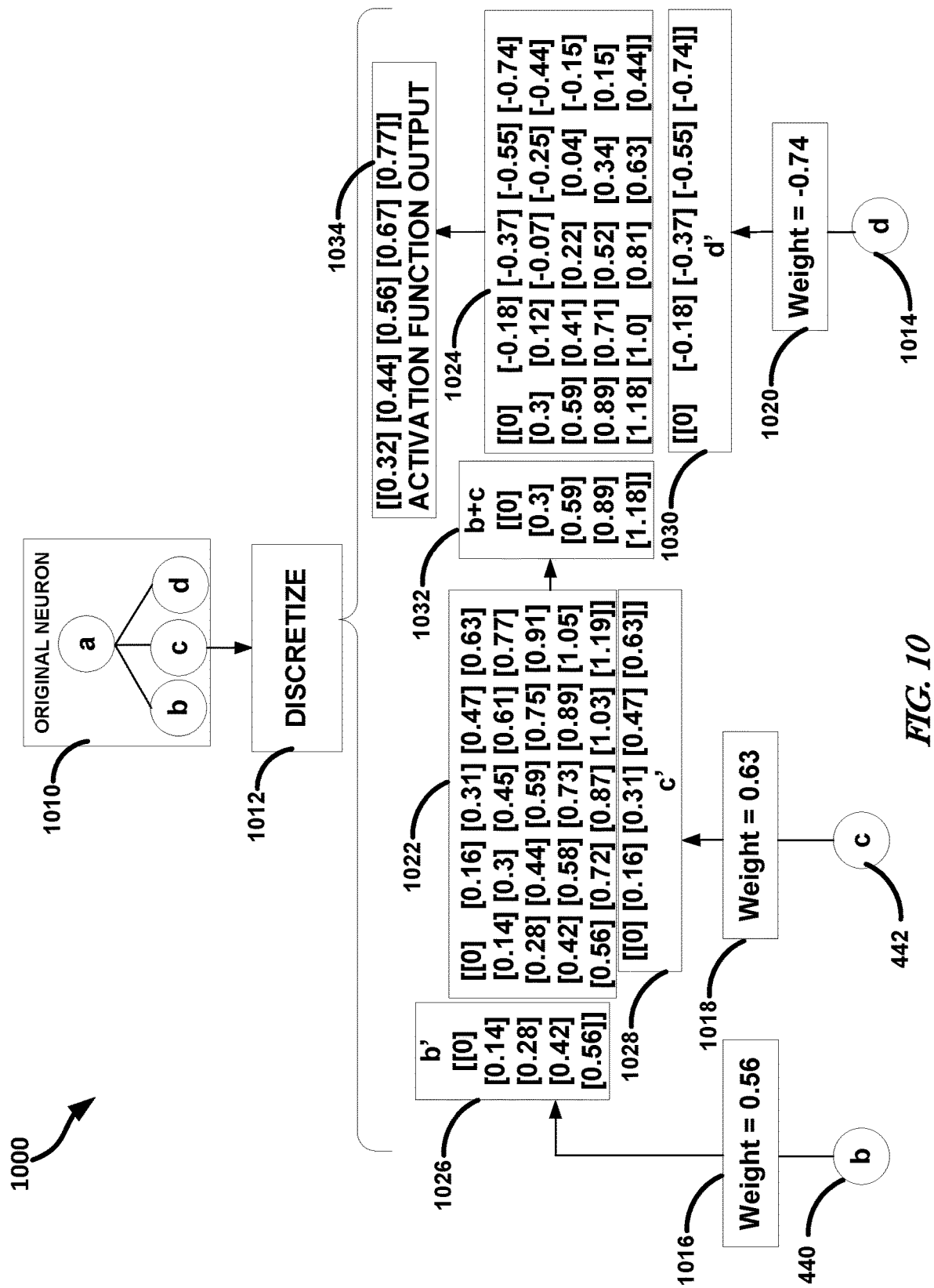
FIG. 10 illustrates, by way of example, an embodiment of a LUT representation of a neuron.

FIG. 10 illustrates, by way of example, an embodiment of a LUT representation 1000 of a three-input neuron 1010. The neuron 1010 can be converted to a LUT through an iterative discretization operation 1012. The iterative discretization operation 1012 follows operations 332 and 334 of the method 300. Each neuron input 440, 442, 1014 is multiplied by a weight 1016, 1018, 1020, respectively, resulting in a weighted neuron input. The weighted neuron input is discretized resulting in discretized neuron inputs 1026, 1028, 1030, respectively. A LUT 1022 represents a mathematical combination of the discretized neuron inputs 1026, 1028. A binned discretized neuron input 1032 is the values of the LUT 1022 binned to provide neuron inputs at each iteration that include a same number of possible values. A LUT 1024 represents a mathematical combination of the discretized neuron inputs 1032, 1030. Possible neuron outputs 1034, based on the LUT 1024, are provided and can include a same number of possible values as the neuron inputs.

Note that the weights 1016, 1018, 1020 in the example of FIG. 10 are applied in order of lowest to highest absolute magnitude. Such a configuration helps prevent any of the neuron inputs 440, 442, 1014 from having an oversized influence on the neuron output and helps keep the discretized version of the neuron (and ultimately NN) nearly as accurate as the original, non-discretized version of the neuron.

Figure 11:
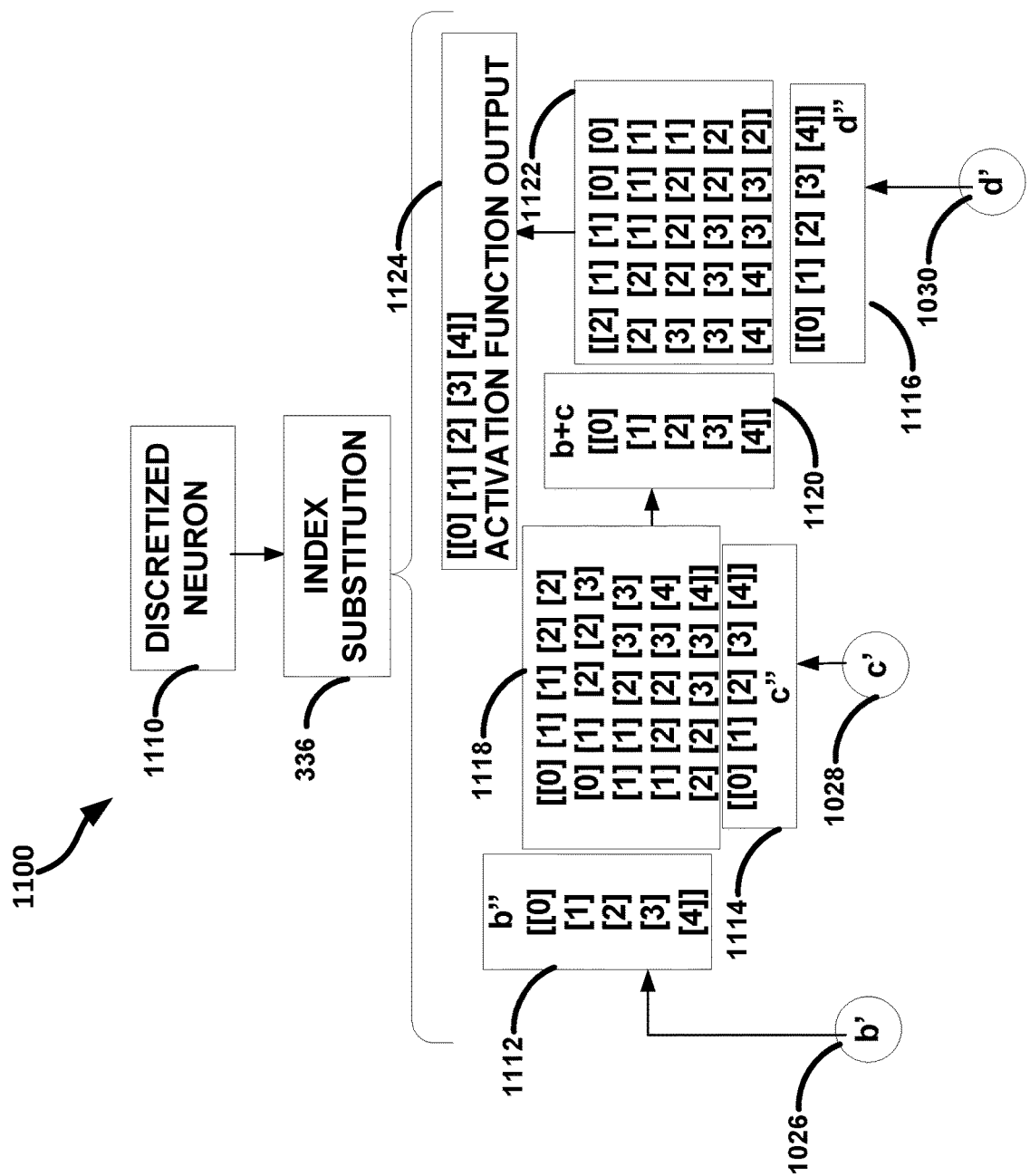
FIG. 11 illustrates, by way of example, an embodiment of a LUT with discretized inputs and discretized outputs converted to indices.

FIG. 11 illustrates, by way of example, an embodiment of a LUT representation of a neuron 1100 with discretized neuron inputs and neuron outputs converted to indices. The neuron 1100 includes a discretized neuron 1110 generated by operation 332. The discretized neuron 1110 can undergo an index substitution operation 336. The index substitution operation 336 illustrated in FIG. 11 is performed on the discretized neuron from FIG. 10. The discretized neuron inputs 1026, 1028, 1030 are converted to indexed neuron inputs 1112, 1114, 1116. A LUT 1118 represents the LUT 1022 after indexing (binning values and representing each bin by an index). A combined, indexed neuron input 1120 represents the combined discretized neuron input 1032 after indexing. A LUT 1122 represents the LUT 1024 after indexing and a neuron output 1124 represents the neuron output 1034 after indexing.

Figure 12:
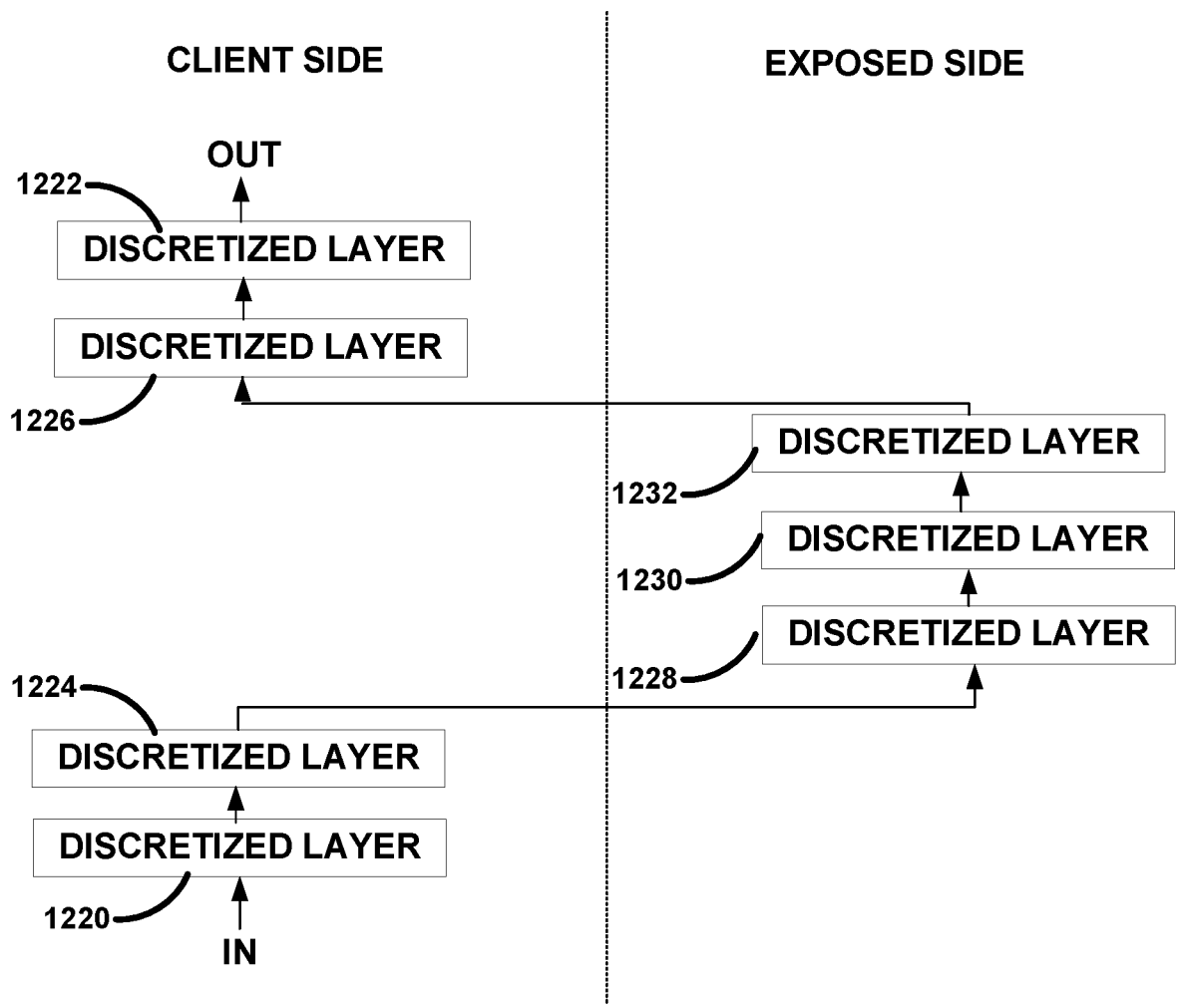
FIG. 12 illustrates, by way of example, a block diagram showing how only a portion of an NN can be discretized.

FIG. 12 illustrates, by way of example, a block diagram showing how only a portion of a discretized NN can be executed by a device. Not all layers of the NN 104 need to be executed on a single device. Only some of the layers can be executed on a first device and other layers can be executed on a different device, remote from the first device to achieve further obfuscation of the gradients. In the Example of FIG. 12, an input layer 1220 and an output layer 1222 have been discretized. The discretized layers 1220, 1222 (among others possibly) can operate on a client-facing device. A client-facing device is one used by an end user of the NN. Client-facing devices include those that provide the input to the NN or receive the output of the NN.

One or more hidden layers 1224, 1226 can be discretized as well. The discretized layers can operate on the client-facing device or an exposed side. The exposed side can include discretized layers 1228, 1230, 1232 operating thereon. The exposed side can be a cloud computing device, a server hosted on a non-cloud network, or the like. The exposed side is called exposed because a non-client entity has access to the NN. Since the exposed portion of the NN is receiving discretized inputs and does not provide an ultimate classification, the knowledge of the gradient is limited and the operation of the NN is obfuscated.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object recognition, or the like.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 13:
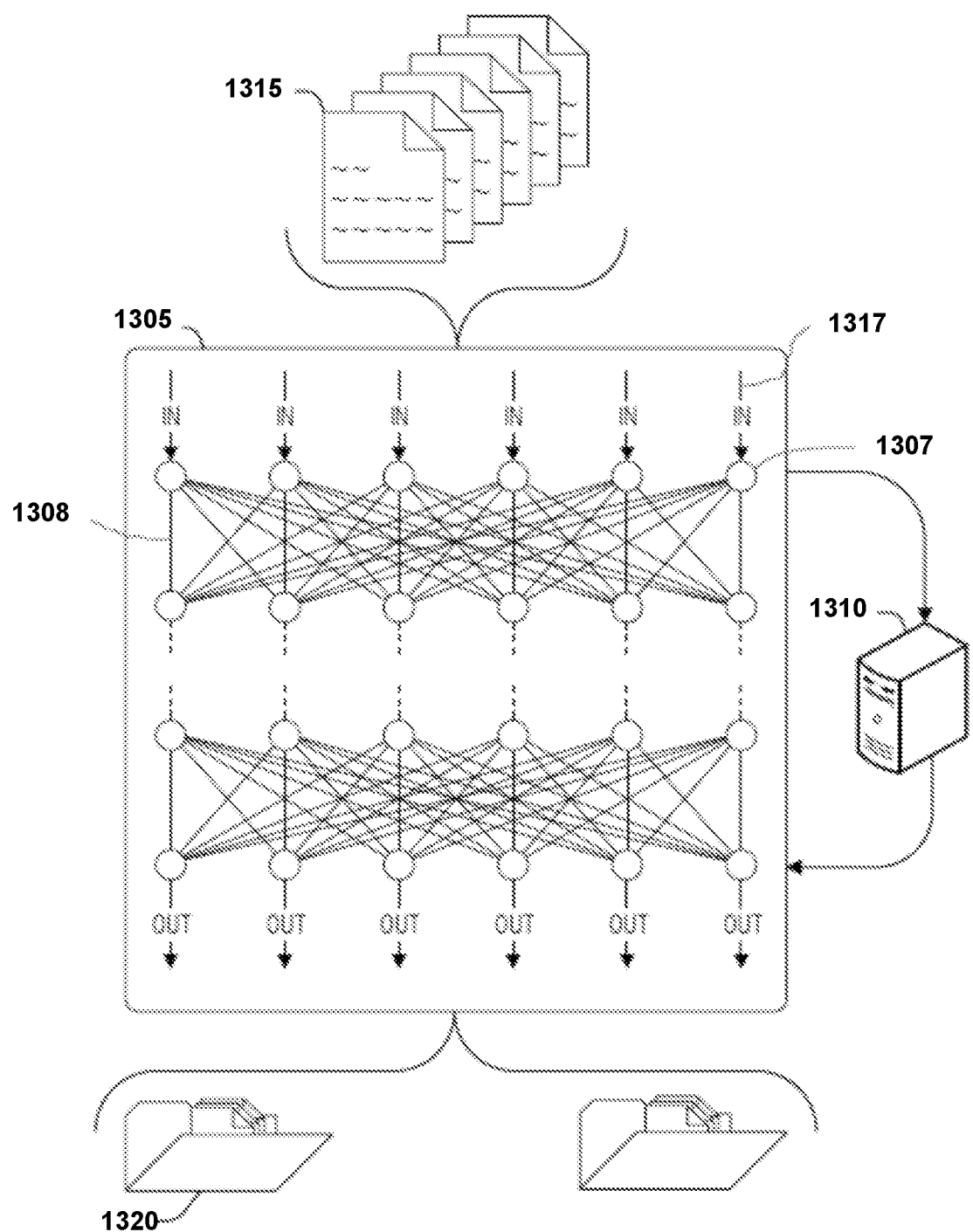
FIG. 13 illustrates, by way of example, a block diagram of an example of an environment including a system for NN training.

FIG. 13 illustrates, by way of example, a block diagram of an example of an environment including a system for NN training. The system includes an artificial NN (ANN) 1305 that is trained using a processing node 610. The processing node 1310 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1305, or even different nodes 1307 within layers. Thus, a set of processing nodes 1310 is arranged to perform the training of the ANN 1305.

The set of processing nodes 1310 is arranged to receive a training set 1315 for the ANN 1305. The ANN 1305 comprises a set of nodes 1307 arranged in layers (illustrated as rows of nodes 1307) and a set of inter-node weights 1308 (e.g., parameters) between nodes in the set of nodes. In an example, the training set 1315 is a subset of a complete training set. Here, the subset may enable processing nodes with limited storage resources to participate in training the ANN 1305.

The training data may include multiple numerical values representative of a domain, such as an image feature, or the like. Each value of the training or input 1317 to be classified after ANN 1305 is trained, is provided to a corresponding node 1307 in the first layer or input layer of ANN 1305. The values propagate through the layers and are changed by the objective function.

As noted, the set of processing nodes is arranged to train the neural network to create a trained neural network. After the ANN is trained, data input into the ANN will produce valid classifications 1320 (e.g., the input data 1317 will be assigned into categories), for example. The training performed by the set of processing nodes 1307 is iterative. In an example, each iteration of the training the ANN 1305 is performed independently between layers of the ANN 1305. Thus, two distinct layers may be processed in parallel by different members of the set of processing nodes. In an example, different layers of the ANN 1305 are trained on different hardware. The members of different members of the set of processing nodes may be located in different packages, housings, computers, cloud-based resources, etc.

In an example, each iteration of the training is performed independently between nodes in the set of nodes. This example is an additional parallelization whereby individual nodes 1307 (e.g., neurons) are trained independently. In an example, the nodes are trained on different hardware.

Figure 14:
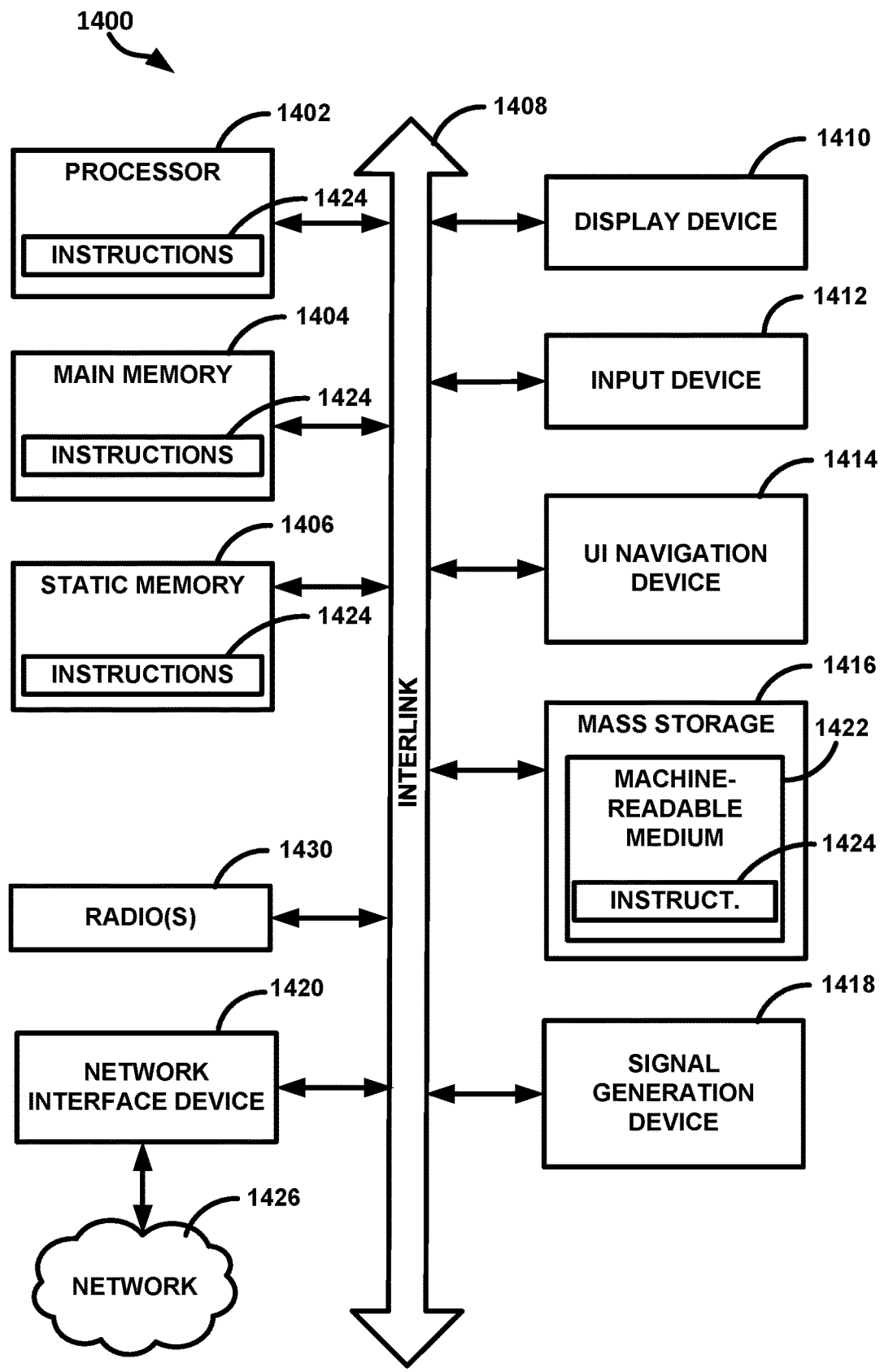
FIG. 14 illustrates, by way of example, a block diagram of an embodiment of a machine in the example form of a computer system within which instructions, for causing the machine to perform any one or more of the methodologies discussed herein, may be executed.

FIG. 14 illustrates, by way of example, a block diagram of an embodiment of a machine in the example form of a computer system 1400 within which instructions, for causing the machine to perform any one or more of the methods discussed herein, may be executed. One or more of the method 300, 700, operation 900, 1012, or other device, component, operation, or method discussed can include, or be implemented or performed by one or more of the components of the computer system 1400. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a mass storage unit 1416, a signal generation device 1418 (e.g., a speaker), a network interface device 1420, and a radio 1430 such as Bluetooth, WWAN, WLAN, and NFC, permitting the application of security controls on such protocols.

The mass storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have ben illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for neural network (NN) architecture obfuscation, the method comprising:
   receiving data representing the NN architecture, the NN architecture including neurons, each neuron comprising corresponding neuron input weights, an activation function, and one or more interconnections between one or more other neurons of the neurons;
   applying the neuron input weights to corresponding inputs, stored in respective memory addresses of a memory, to the neurons resulting in weighted neuron inputs;
   mapping the weighted neuron inputs to the neurons from a continuous domain to a discrete domain resulting in discretized neuron inputs and storing the discretized neuron inputs in same or different respective memory addresses;
   for a given neuron of the neurons, mathematically combining, in order by smallest weight to largest weight, discretized neuron inputs resulting in combined neuron inputs to the given neuron and storing the combined neuron inputs in a respective memory address, the combining including binning possible values of a first neuron input of the neuron inputs into a first specified number of bins and then combining the first specified number of bins with a second neuron input of the neuron inputs and binning results of combining the specified number bins with the second neuron input into a second specified number of bins resulting in second binned inputs, the first specified number of bins and the second specified number of bins include a same number of bins to maintain a lookup table (LUT) that defines the output of the activation function based on the input to a specified size that consumes a specified number of addresses in the memory; and
   applying the activation function to the second binned inputs resulting in a discretized neuron output by mapping a combined neuron input of the combined neuron inputs to a bin of the second specified number of bins and mapping the bin to the LUT.

2. The method of claim 1, further comprising converting the discretized neuron inputs and discretized neuron outputs to indices resulting in indexed neuron inputs and indexed neuron outputs, respectively, the indices are integers that differ from a nearest integer by a value of one.

3. The method of claim 2, further comprising scrambling the indexed neuron inputs and indexed neuron outputs resulting in scrambled indexed neuron inputs and scrambled indexed neuron outputs, respectively.

4. The method of claim 1, further comprising scrambling the discretized neuron inputs and the discretized neuron outputs resulting in scrambled discretized neuron inputs and scrambled discretized neuron outputs, respectively.

5. The method of claim 1, wherein mapping the neuron inputs comprises discretizing the neuron inputs or quantizing the neuron inputs.

6. The method of claim 1, wherein the data representing the NN architecture includes data representing an NN input layer and an output layer of the NN architecture.

7. The method of claim 6, further comprising providing, for each of the neurons, the discretized neuron inputs and discretized neuron outputs as a lookup table.

8. The method of claim 7, further comprising converting one or more of the discretized neuron outputs to a classification.

9. A non-transitory machine-readable medium including instructions that, when executed by a machine, cause the machine to perform operations for neural network (NN) architecture obfuscation, the operations comprising:

receiving data representing the NN architecture, the NN architecture including neurons, each neuron comprising corresponding input weights, an activation function, and one or more interconnections between one or more other neurons of the neurons;

applying the neuron input weights to corresponding inputs, stored in respective memory addresses of a memory, to the neurons resulting in weighted neuron inputs;

mapping the weighted neuron inputs to the neurons from a continuous domain to a discrete domain resulting in discretized inputs and storing the discretized neuron inputs in same or different respective memory addresses;

for a given neuron of the neurons, mathematically combining, in order by smallest weight to largest weight, weighted neuron inputs resulting in combined neuron inputs to the given neuron and storing the combined neuron inputs in a respective memory address, the combining including binning possible values of a first neuron input of the neuron inputs into a first specified number of bins and then combining the first specified number of bins with a second neuron input of the neuron inputs and binning results of combining the specified number bins with the second neuron input into a second specified number of bins resulting in second binned inputs, the first specified number of bins and the second specified number of bins include a same number of bins to maintain a lookup table (LUT) that defines the output of the activation function based on the input to a specified size that consumes a specified number of addresses in the memory; and applying the activation function to the second binneddiscretized inputs resulting in discretized neuron outputs by mapping a combined neuron input to the neuron to a bin of the second specified number of bins and mapping the bin to the LUT.

10. The non-transitory machine-readable medium of claim 9, wherein the operations further comprise converting the discretized inputs and discretized neuron outputs to indices resulting in input indices and neuron output indices, respectively.

11. The non-transitory machine-readable medium of claim 10, wherein the operations further comprise scrambling the input indices and neuron output indices resulting in scrambled input indices and scrambled output indices, respectively.

12. The non-transitory machine-readable medium of claim 9, wherein the operations further comprise scrambling the discretized inputs and the discretized neuron outputs resulting in scrambled discretized inputs and scrambled discretized outputs, respectively.

13. The non-transitory machine-readable medium of claim 9, wherein mapping the inputs to the neurons comprises discretizing the inputs or quantizing the inputs.

14. A system comprising:
processing circuitry; and
one or more memories including respective memory addresses and instructions that, when executed by the processing circuitry, cause the processing circuitry to perform operations for neural network (NN) architecture obfuscation, the operations comprising:

receiving data representing the NN architecture, the NN architecture including neurons, each neuron comprising corresponding input weights, an activation function, and one or more interconnections between one or more other neurons of the neurons;

applying the neuron input weights to corresponding inputs, stored in one or more of the respective memory addresses, to the neurons resulting in weighted neuron inputs;

mapping the weighted neuron inputs to the neurons from a continuous domain to a discrete domain resulting in discretized inputs and storing the discretized neuron inputs in same or different one or more respective memory addresses;

for a given neuron of the neurons, mathematically combining, in order by smallest weight to largest weight, weighted neuron inputs resulting in combined neuron inputs to the given neuron and storing the combined neuron inputs in a respective memory address, the combining including binning possible values of a first neuron input of the neuron inputs into a first specified number of bins and then combining the first specified number of bins with a second neuron input of the neuron inputs and binning results of combining the specified number bins with the second neuron input into a second specified number of bins resulting in second binned inputs, the first specified number of bins and the second specified number of bins include a same number of bins to maintain a lookup table (LUT) that defines the output of the activation function based on the input to a specified size that consumes a specified number of addresses in the memory; and applying the activation function to the second binned inputs resulting in discretized neuron outputs by mapping a combined neuron input to the neuron to a bin of the second specified number of bins and mapping the bin to the LUT.

* * * * *